United States Patent Office.

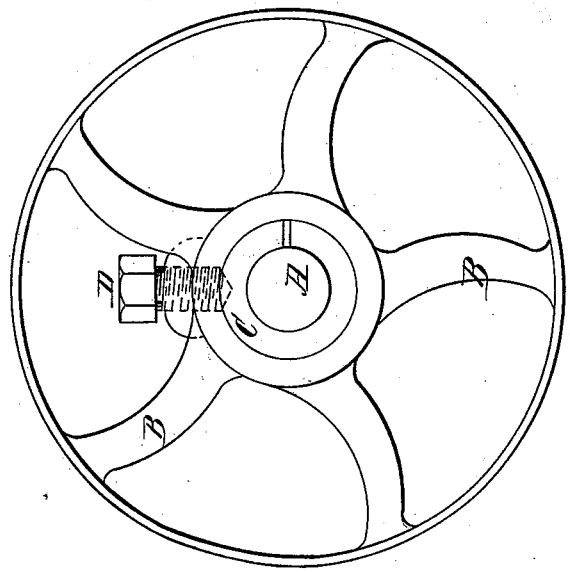
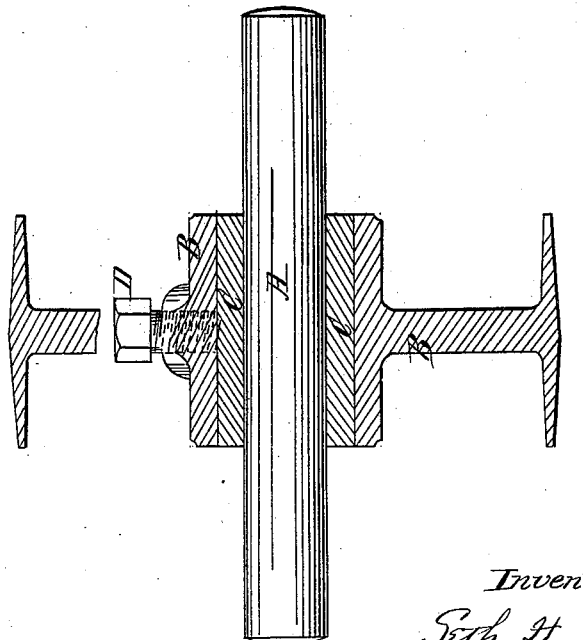

SETH H. WHITMORE, OF DECATUR, ILLINOIS, ASSIGNOR TO CALEB C. BURROUGHS AND JAMES MILLIKEN, OF SAME PLACE.

*Letters Patent No. 106,756, dated August 23, 1870.*

IMPROVEMENT IN SHAFT-COUPLING.

The Schedule referred to in these Letters Patent and making part of the same.

*To all whom it may concern:*

Be it known that I, SETH H. WHITMORE, of Decatur, in the county of Macon and in the State of Illinois, have invented certain new and useful Improvements in Securing Pulleys and Wheels to Shafts; and do hereby declare that the following is a full, clear, and exact description thereof, reference being had to the accompanying drawing and to the letters of reference marked thereon, making a part of this specification.

The nature of my invention consists in an improved method of securing wheels and pulleys to shafts, by means of a sleeve introduced between the hub of the wheel or pulley and the shaft.

In order to enable others skilled in the art to which my invention appertains to make and use the same, I will now proceed to describe its construction and operation, referring to the annexed drawing, in which—

Figure 1 is a longitudinal vertical section, and

Figure 2, a side view of my invention.

A represents the shaft, and

B, the wheel or pulley, made in any of the known or usual styles.

A sleeve, C, is put on the inside of the hub, said sleeve being slotted on one side from end to end, and receives the end of the set-screw D, instead of the shaft, as in the common way.

By driving the set-screw D down on the sleeve C, on the outer side, it closes the inner side onto the the shaft, thus giving the sleeve a bearing on the entire surface of the shaft, also prevents the set-screw from injuring the shaft, as is the case when driven onto or into it, at the same time making the pulley to have more power.

If deemed necessary to prevent the sleeve from turning on the shaft, it may be fastened by a key instead of a set-screw or screws, by putting the key between the hub of the wheel or pulley and the slotted sleeve.

Having thus fully described my invention,

What I claim as new, and desire to secure by Letters Patent, is—

The method herein described of securing wheels or pulleys to shafts, by means of a slotted sleeve introduced between the hub of said wheel or pulley and the shaft, and fastened by one or more set-screws or keys, substantially as and for the purposes herein set forth.

In testimony that I claim the foregoing, I have hereunto set my hand this 31st day of January, 1870.

SETH H. WHITMORE.

Witnesses:
ALLEN LITSINBERGER,
B. B. BABCOCK.